United States Patent
Nishikawa et al.

(10) Patent No.: US 6,875,715 B2
(45) Date of Patent: Apr. 5, 2005

(54) GLASS CERAMIC DIELECTRIC MATERIAL SUITABLE FOR PRODUCTION OF A MICROWAVE CIRCUIT COMPONENT

(75) Inventors: Yoshikatsu Nishikawa, Otsu (JP); Yoshio Umayahara, Kusatsu (JP)

(73) Assignee: Nippon Electric Glass Co., Ltd., Otsu (JP)

(*) Notice: Subject to any disclaimer, the term of this patent is extended or adjusted under 35 U.S.C. 154(b) by 35 days.

(21) Appl. No.: 10/379,181

(22) Filed: Mar. 4, 2003

(65) Prior Publication Data

US 2003/0166448 A1 Sep. 4, 2003

(30) Foreign Application Priority Data

Mar. 4, 2003 (JP) ........................................ 2002/057236

(51) Int. Cl.⁷ .......................... C03C 3/078; C03C 3/062; C03C 10/04
(52) U.S. Cl. ............................... 501/72; 501/5; 501/10; 501/21; 501/32; 501/73
(58) Field of Search ............................... 501/72, 73, 5, 501/10, 21, 32

(56) References Cited

U.S. PATENT DOCUMENTS 3,279,932 A * 10/1966 Earl ........................... 501/21
3,758,705 A 9/1973 Schmid .................. 174/113 R
6,232,251 B1 5/2001 Terashi .......................... 501/5

FOREIGN PATENT DOCUMENTS

EP 0626165 A 11/1994
JP 10-120436 5/1998

* cited by examiner

Primary Examiner—Karl Group
(74) Attorney, Agent, or Firm—Collard & Roe, P.C.

(57) ABSTRACT

Glass powder for a dielectric material has a nature that, when fired, diopside ($CaMgSi_2O_6$) and at least one of titanite ($CaTi(SiO_4)O$) and titania ($TiO_2$) are precipitated. Preferably, the glass powder has a composition including $SiO_2$, CaO, MgO, and $TiO_2$ and the total content of these components is 80 mass % or more. Preferably, the glass powder comprises, by mass percent, 35–65% $SiO_2$, 10–30% CaO, 10–20% MgO, and 12–30% $TiO_2$.

10 Claims, No Drawings

GLASS CERAMIC DIELECTRIC MATERIAL SUITABLE FOR PRODUCTION OF A MICROWAVE CIRCUIT COMPONENT

BACKGROUND OF THE INVENTION

This application claims priority to Japanese Patent Application No. 2002-57236, disclosure of which is incorporated herein by reference.

The present invention relates to a glass ceramic dielectric material suitable for production of a microwave circuit component.

As a material of a circuit component, such as a ceramic substrate, to which ICs or LSIs are mounted at a high density, use is made of an alumina ceramic material and a glass ceramic material including glass powder and ceramic powder. In particular, the glass ceramic material can be fired at a temperature not higher than 1000° C. although it is inferior in mechanical strength to the alumina ceramic material. Therefore, the glass ceramic material is advantageous in that the material can be co-fired with Ag, Cu, or the like low in conductor resistance.

In recent years, remarkable development has been achieved in the fields of a mobile communication apparatus, such as a mobile telephone and a personal radio equipment, and a new media apparatus used in a new media, such as satellite broadcasting, satellite communication, and CATV. In the mobile communication apparatus and the new media apparatus, a microwave circuit component is used. It is required that the microwave circuit component is made of a material low in dielectric loss in a high-frequency region not lower than 0.1 GHz.

Sometimes, the microwave circuit component itself is required to serve as a resonator. In this case, the material of the microwave circuit component is required to have temperature stability, i.e., to be unchanged in resonance frequency depending upon the temperature.

For example, Japanese Unexamined Patent Publication No. H10-120436 (JP 10-120436 A) proposes a glass ceramic material which precipitates diopside crystals. By the use of the glass ceramic material, it is possible to obtain a sintered product low in dielectric loss in the high-frequency region. However, the glass ceramic material has a dielectric constant between 6 and 8, which is lower than that of alumina. In addition, the glass ceramic material is inferior in temperature stability because a temperature coefficient of the resonance frequency is −65 ppm/° C.

SUMMARY OF THE INVENTION

It is therefore an object of the present invention to provide a glass ceramic dielectric material which is capable of producing a sintered product having a dielectric constant equivalent to that of alumina and is excellent in temperature stability.

It is another object of the present invention to provide a glass ceramic dielectric material of the type described, which is capable of producing a sintered product being low in dielectric loss at a frequency in a microwave region.

It is still another object of the present invention to provide a glass ceramic dielectric material of the type described, which is capable of producing a sintered product having a near-zero temperature coefficient of a resonance frequency.

It is yet another object of the present invention to provide a glass ceramic dielectric material of the type described, which is capable of being fired at a temperature not higher than 1000° C. to produce any of the sintered products.

Other objects of the present invention will become clear as the description proceeds.

As a result of extensive studies, the present inventors have found out that the dielectric constant equivalent to that of alumina and the near-zero temperature coefficient of the resonance frequency are simultaneously achieved by precipitation of at least one of titanite and titania in addition to diopside.

According to an aspect of the present invention, there is provided glass powder for a dielectric material, which has a nature that, when fired, diopside ($CaMgSi_2O_6$) and at least one of titanite ($CaTi(SiO_4)O$) and titania ($TiO_2$) are precipitated.

According to another aspect of the present invention, there is provided glass powder for a dielectric material, which comprises, by mass percent, 35–65% $SiO_2$, 10–30% CaO, 10–20% MgO, and 12–30% $TiO_2$.

According to still another aspect of the present invention, there is provided a glass ceramic sintered product which includes, as precipitated crystals, diopside ($CaMgSi_2O_6$) and at least one of titanite ($CaTi(SiO_4)O$) and titania ($TiO_2$).

According to yet another aspect of the present invention, there is provided a microwave circuit component comprising a dielectric layer of a glass ceramic sintered product which includes, as precipitated crystals, diopside ($CaMgSi_2O_6$) and at least one of titanite ($CaTi(SiO_4)O$) and titania ($TiO_2$).

DESCRIPTION OF THE PREFERRED EMBODIMENT

Now, description will be made of a glass ceramic dielectric material according to an embodiment of the present invention.

Preparation is made of a glass ceramic dielectric material which, when fired, produces a glass ceramic sintered product containing, as precipitated crystals, not only diopside having a low dielectric loss but also titanite ($CaTi(SiO_4)O$) and/or titania ($TiO_2$) high in dielectric constant than diopside. In other words, the glass ceramic dielectric material has ability of precipitating diopside and titanite and/or titania. By precipitation of these crystals, i.e., titanite and/or titania, in addition to diopside, the dielectric constant and the dielectric loss of the resultant glass ceramic sintered product in a high-frequency region not lower than 0.1 GHz can be adjusted to 9–10 and 20 or less, respectively.

The amount of the precipitated crystals can be controlled by the content of $TiO_2$. For example, if it is desired to inrease the amount of the precipitated crystals, the content of $TiO_2$ is increased.

In order to precipitate the crystals, use is made of crystallizable glass powder including $SiO_2$, CaO, MgO, and $TiO_2$ as main components so that the total content of these main components is 80 mass % or more, preferably 90 mass % or more. If the total content of the main components is smaller than 80 mass %, it is often that heterogeneous or different crystals are precipitated or desired crystals are not precipitated. It is desired to use a glass comprising, by mass %, 35–65% $SiO_2$, 10–30% CaO, 10–20% MgO, and 12–30% $TiO_2$.

Next, description will be made of a composition range of the glass powder.

$SiO_2$ serves as a network former of the glass and as a component of diopside and titanite. The content of $SiO_2$ is 35–65%, preferably 40–55%. If the content of $SiO_2$ is smaller than 35%, vitrification is difficult. On the other hand, if the content is greater than 65%, firing at a temperature not higher than 1000° C. is difficult. This makes it difficult to use Ag or Cu as a conductor or an electrode.

CaO is a component of diopside and titanite. The content of CaO is 10–30%, preferably 15–25%. If the content of CaO is smaller than 10%, these crystals are hardly precipitated so that the dielectric loss is increased or the dielectric constant is not increased. If the content is greater than 30%, vitrification is difficult.

MgO is a component of diopside. The content of MgO is 10–20%, preferably 12–17%. If the content of MgO is smaller than 10%, precipitation of crystals is difficult. If the content is greater than 20%, vitrification is difficult.

$TiO_2$ is a component to increase the dielectric constant of the glass as well as a component of titanite and titania. The content of $TiO_2$ is 12–30%, preferably 15–27%. If the content of $TiO_2$ is smaller than 12%, precipitation of titanite and/or titania is difficult and the dielectric constant is not sufficiently increased. In addition, the temperature coefficient of the resonance frequency is lower than −10 ppm/° C. If the content is greater than 30%, the dielectric constant becomes excessively high. Simultaneously, the temperature coefficient of the resonance frequency is higher than 10 ppm/° C.

In addition to the above-mentioned components, other components may be added as additional components as far as electrical characteristics such as the dielectric constant and the dielectric loss are not degraded. For example, in order to improve meltability, 10% or less SrO and/or 10% or less BaO may be added. In order to improve chemical durability, 10% or less $ZrO_2$ may be added. It is desired that the total content of these additional components is restricted to be smaller than 20%.

The glass ceramic dielectric material may comprise the above-mentioned glass powder alone. Alternatively, for the purpose of improving mechanical characteristics such as bending strength and toughness of the resultant sintered product, the glass powder may be mixed with ceramic powder. In this case, the amount of the ceramic powder to be mixed is preferably not greater than 50 mass %. This is because a dense and compact structure is difficult to obtain if the amount of the ceramic powder exceeds 50 mass %.

Preferably, the ceramic powder has a dielectric constant of 16 or less and a dielectric loss not greater than $10 \times 10^{-4}$ in a frequency region between 0.1 and 10 GHz. For example, use may be made of alumina, cristobalite, forsterite, zircon, and zirconia. If the dielectric constant of the ceramic powder exceeds 16, the dielectric constant of the glass ceramic sintered product tends to become high. If the ceramic powder has a dielectric loss exceeding $10 \times 10^{-4}$ in a frequency region between 0.1 and 10 GHz, the dielectric loss of the glass ceramic sintered product is increased.

The glass ceramic dielectric material described above can be fired at a low temperature not higher than 1000° C. Therefore, Ag or Cu low in conductor resistance can be used as a conductor.

Next, description will be made of a method of producing a circuit component by the use of the above-mentioned glass ceramic dielectric material.

At first, preparation is made of glass powder or mixed powder of glass powder and ceramic powder. To the glass powder or the mixed powder, a binder, a plasticizer, and a solvent in predetermined amounts are added to prepare a slurry. For example, the binder may be polyvinylbutyral resin or methacrylate resin. The plasticizer may be dibutyl phthalate. The solvent may be toluene or methyl ethyl ketone.

Then, the slurry is formed into a green sheet by the doctor blade method. Thereafter, the green sheet is dried or dehydrated, cut into a predetermined size, and subjected to mechanical working to form via holes. A low-resistance metal material to serve as a conductor or an electrode is filled in the via holes and deposited on the surface of the green sheet. Then, a plurality of similar green sheets are laminated and integrated by thermocompression bonding.

Next, the green sheets thus laminated are fired to obtain a glass ceramic sintered product. The sintered product thus produced has the conductor and the electrode in the interior or on the surface thereof. Preferably, the firing temperature is not higher than 1000° C., more particularly, 800–950° C.

The glass ceramic sintered product thus obtained has a dielectric constant between 9 and 10, which is approximate to that of alumina. Therefore, in case where the glass ceramic sintered product is used instead of alumina, it is unnecessary to widely change a circuit design. Furthermore, since the glass ceramic sintered product has a low dielectric loss and a near-zero temperature coefficient of a resonance frequency in a high-frequency region not lower than 0.1 GHz, the glass ceramic sintered product is suitable for use as a microwave circuit component.

A chip or chips of Si-based or GaAs-based semiconductor devices are connected to the glass ceramic sintered product produced in the manner described above. Thus, a microwave circuit component having a dielectric layer of the glass ceramic sintered product is obtained.

In the foregoing, the green sheet is used for production of the glass ceramic sintered product. However, without being restricted thereto, use may be made of various other methods generally used for production of ceramic.

Hereinafter, several specific examples of the present invention will be described together with a comparative example.

Tables 1 and 2 show the specific examples (Samples Nos. 1–6) of the present invention and the comparative example (Sample No. 7).

Each sample was prepared in the following manner.

At first, a glass material having each composition in Tables was prepared. Thereafter, the glass material was put into a platinum crucible, melted at 1400 to 1500° C. for 3 to 6 hours, and formed by a water-cooled roller into a formed product in the shape of a thin plate. Then, the formed product was coarsely pulverized and then subjected to wet grinding by a ball mill with alcohol added thereto. Thus, glass powder having an average particle size of 1.5 to 3.0 μm was obtained. For each of Samples Nos. 2 to 6, the ceramic powder (having an average particle size of 2 μm) shown in Tables was added to the glass powder to obtain mixed powder.

TABLE 1

| Sample | 1 | 2 | 3 | 4 |
|---|---|---|---|---|
| Glass Composition (mass %) | | | | |
| $SiO_2$ | 48 | 45 | 37 | 42 |
| CaO | 20 | 19 | 24 | 25 |
| MgO | 15 | 14 | 17 | 16 |
| $TiO_2$ | 17 | 22 | 20 | 25 |
| SrO | — | — | 2 | — |
| $ZrO_2$ | — | — | — | 2 |
| BaO | — | — | — | — |

TABLE 1-continued

| Sample | 1 | 2 | 3 | 4 |
|---|---|---|---|---|
| Ceramic Powder | | | | |
| species | — | alumina | forsterite | cristobalite |
| ratio (mass %) | — | 40 | 30 | 35 |
| Firing Temperature (° C.) | 880 | 900 | 890 | 900 |
| Precipitated Crystals | diopside titanite titania (rutile) | diopside titanite titania (rutile) | diopside titanite titania (rutile) | diopside titanite titania (rutile) |
| Dielectric Constant | 9.6 | 9.3 | 9.2 | 9.8 |
| Dielectric Loss (×10$^{-4}$) | 15 | 11 | 13 | 15 |
| Temperature Coefficient of Resonance Frequency (ppm/° C.) | −5 | 3 | 2 | 7 |

TABLE 2

| Sample | 5 | 6 | 7 |
|---|---|---|---|
| Glass Composition (mass %) | | | |
| SiO$_2$ | 43 | 51 | 50 |
| CaO | 27 | 20 | 30 |
| MgO | 13 | 12 | 20 |
| TiO$_2$ | 15 | 17 | — |
| SrO | — | — | — |
| ZrO$_2$ | — | — | — |
| BaO | 2 | — | — |
| Ceramic Powder | | | |
| species | zircon | zirconia | alumina |
| ratio (mass %) | 25 | 30 | 40 |
| Firing Temperature (° C.) | 890 | 900 | 900 |
| Precipitated Crystals | diopside titanite | diopside titanite titania (rutile) | diopside |
| Dielectric Constant | 9.7 | 9.5 | 7.8 |
| Dielectric Loss (×10$^{-4}$) | 14 | 11 | 8 |
| Temperature Coefficient of Resonance Frequency (ppm/° C.) | −7 | −6 | −65 |

For each of the powder samples thus obtained, the firing temperature, the precipitated crystals, the dielectric constant, the dielectric loss, and the temperature coefficient of resonance frequency were measured.

As seen from Tables, it has been confirmed that each of Samples 1 to 6 can be fired at a low temperature between 880 and 900° C. and, after firing, contained titanite crystals and/or titania crystals precipitated therein in addition to diopside crystals. At a frequency of 2.4 GHz, each of Samples 1 to 6 had a dielectric constant between 9.2 and 9.8, which is equivalent to that of alumina, and a small dielectric loss. Furthermore, the temperature coefficient of the resonance frequency was −7 to 7 ppm/° C., which is a near-zero value. On the other hand, Sample No. 7 had a low dielectric constant of 7.8. The temperature coefficient of the resonance frequency was −65 ppm/° C., which is apart from zero.

The firing temperature was determined as follows. To the sintered products fired at various temperatures, ink was applied and then wiped off. Among those samples which had no residue of ink (i.e., which were densely sintered), one sample fired at a lowest temperature was selected. The lowest temperature was used as the firing temperature.

The precipitated crystals were identified by the X-ray diffraction analysis after each sample was fired at the temperature shown in Tables.

The dielectric constant and the dielectric loss were measured by the use of the fired sample. The values at a temperature of 25° C. were obtained by the use of a cavity resonator (at the measurement frequency of 2.4 GHz).

The temperature coefficient of the resonance frequency was obtained for the fired sample in accordance with Japanese Industrial Standard JIS R1627 (at the resonance frequency of 15 GHz).

What is claimed is:

1. Glass powder for a dielectric material which comprises, by mass percent, 35–65% SiO$_2$, 10–30% CaO, 10–20% MgO, and 12–30% TiO$_2$, and which has a nature that, when fired, diopside (CaMgSi$_2$O$_6$) and at least one of titanite (CaTi(SiO$_4$)O) and titania (TiO$_2$) are precipitated.

2. A glass ceramic dielectric material, which includes the glass powder according to claim 1.

3. A glass ceramic dielectric material according to claim 2, which further includes ceramic powder.

4. A glass ceramic dielectric material according to claim 3, wherein the ceramic powder has a dielectric constant of 16 or less and a dielectric loss of 10×10$^{-4}$ or less in a frequency region between 0.1 and 10 GHz.

5. A glass ceramic dielectric material according to claim 3, wherein the ratio of the glass powder is 50–100 mass % while the ratio of the ceramic powder is 0–50 mass %.

6. A green sheet comprising the glass ceramic dielectric material according to claim 2.

7. Glass powder for a dielectric material, which comprises, by mass percent, 35–65% SiO$_2$, 10–30 CaO, 10–20% MgO, and 12–30% TiO$_2$.

8. A glass ceramic dielectric material, which includes the glass powder according to claim 7.

9. A glass ceramic dielectric material according to claim 8, which further includes ceramic powder.

10. A green sheet comprising the glass ceramic dielectric material according to claim 8.

* * * * *